(12) United States Patent
Yamada

(10) Patent No.: US 12,166,929 B2
(45) Date of Patent: Dec. 10, 2024

(54) IMAGE DISPLAY METHOD, IMAGE DISPLAY DEVICE, AND STORAGE MEDIUM STORING DISPLAY CONTROL PROGRAM FOR DISPLAYING FIRST IMAGE AND SECOND IMAGE IN DISPLAY AREA

(71) Applicant: SEIKO EPSON CORPORATION, Tokyo (JP)

(72) Inventor: Yusuke Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 363 days.

(21) Appl. No.: 17/389,812

(22) Filed: Jul. 30, 2021

(65) Prior Publication Data

US 2022/0035509 A1  Feb. 3, 2022

(30) Foreign Application Priority Data

Jul. 31, 2020 (JP) .................. 2020-130908

(51) Int. Cl.
| | |
|---|---|
| *H04N 1/00* | (2006.01) |
| *G06F 3/04815* | (2022.01) |
| *G06F 3/0482* | (2013.01) |
| *G06F 16/54* | (2019.01) |
| *H04N 13/106* | (2018.01) |

(52) U.S. Cl.
CPC ..... *H04N 1/00442* (2013.01); *G06F 3/04815* (2013.01); *G06F 3/0482* (2013.01); *G06F 16/54* (2019.01); *H04N 1/00448* (2013.01); *H04N 13/106* (2018.05); *G06F 2203/04803* (2013.01)

(58) Field of Classification Search
CPC ....... G06F 3/04815; G06F 2203/04803; G06F 2203/04802; G06F 3/04817; G06F 3/0485; G06F 3/0483; G06F 3/0482; G06F 16/54; H04N 1/00448; H04N 13/106; H04N 21/4312; H04N 1/00442; H04N 1/00445; H04N 1/0045; H04N 1/00453; H04N 1/00456
See application file for complete search history.

(56) References Cited

U.S. PATENT DOCUMENTS

| | | | |
|---|---|---|---|
| 7,446,784 B2 * | 11/2008 | Crew | ............. G06T 3/40 345/679 |
| 8,159,529 B2 | 4/2012 | Yoshida et al. | |

(Continued)

FOREIGN PATENT DOCUMENTS

| | | |
|---|---|---|
| CN | 101228799 A | 8/2011 |
| JP | H05-204583 A | 8/1993 |

(Continued)

*Primary Examiner* — Nicholas Ulrich
(74) *Attorney, Agent, or Firm* — WORKMAN NYDEGGER

(57) ABSTRACT

Disclosed is an image display method of displaying a first image and a second image in a display area, the second image being adjacent to the first image. The image display method includes: performing display with switching between a first display mode and a second display mode. The first display mode is a mode in which the first image displayed as a three-dimensional image and the second image displayed as a three-dimensional image are displayed. The second display mode is a mode in which the first image displayed as a two-dimensional image and the second image displayed as a two-dimensional image are displayed.

21 Claims, 8 Drawing Sheets

(56) References Cited

U.S. PATENT DOCUMENTS

| | | | | |
|---|---|---|---|---|
| 2006/0161868 A1* | 7/2006 | Van Dok | | G06F 3/0481 |
| | | | | 715/835 |
| 2008/0309755 A1 | 12/2008 | Yoshida et al. | | |
| 2010/0128058 A1* | 5/2010 | Kawabata | | H04N 21/84 |
| | | | | 345/593 |
| 2011/0018868 A1* | 1/2011 | Inoue | | H04N 13/279 |
| | | | | 345/419 |
| 2011/0102335 A1* | 5/2011 | Miyamura | | G06F 3/04886 |
| | | | | 345/173 |
| 2011/0163971 A1* | 7/2011 | Wagner | | G06F 3/04817 |
| | | | | 345/173 |
| 2011/0279653 A1* | 11/2011 | Hoshino | | G03B 35/08 |
| | | | | 348/47 |
| 2012/0084732 A1* | 4/2012 | Filippov | | G06F 3/04842 |
| | | | | 715/838 |
| 2012/0287165 A1* | 11/2012 | Yamada | | G06F 3/147 |
| | | | | 345/672 |
| 2014/0118513 A1* | 5/2014 | Takahashi | | H04N 13/356 |
| | | | | 348/54 |
| 2016/0080647 A1* | 3/2016 | Kimura | | G06T 3/4038 |
| | | | | 348/36 |
| 2019/0138175 A1* | 5/2019 | Lucca | | G06F 3/0482 |
| 2019/0236781 A1* | 8/2019 | Shimizu | | G06T 7/0012 |
| 2020/0168178 A1 | 5/2020 | Yamada | | |

FOREIGN PATENT DOCUMENTS

| | | |
|---|---|---|
| JP | 2009-508274 | 2/2009 |
| JP | 2011-221586 | 11/2011 |
| JP | 2012-124613 A | 6/2012 |
| JP | 2012-238223 | 12/2012 |
| JP | 2013-503406 A | 1/2013 |
| JP | 2020-086111 | 6/2020 |
| WO | 2007/033354 | 3/2007 |
| WO | 2011/025749 A | 3/2011 |

* cited by examiner

IMAGE DISPLAY METHOD, IMAGE DISPLAY DEVICE, AND STORAGE MEDIUM STORING DISPLAY CONTROL PROGRAM FOR DISPLAYING FIRST IMAGE AND SECOND IMAGE IN DISPLAY AREA

The present application is based on, and claims priority from JP Application Serial Number 2020-130908, filed Jul. 31, 2020, the disclosure of which is hereby incorporated by reference herein in its entirety.

BACKGROUND

1. Technical Field

The present disclosure relates to an image display method, an image display device, and a non-transitory computer-readable storage medium storing a display control program.

2. Related Art

In mobile terminal devices and the like, a plurality of images is displayed on a screen.

In a display method disclosed in JP-A-2020-086111, plural thumbnail images displayed as three-dimensional images are arranged on a first virtual axis, and images located next to each other are displayed in a state in which they partially overlap with each other.

Although the technique disclosed in JP-A-2020-086111 makes it possible to display many images in a display area by arranging the plurality of three-dimensional images on the virtual axis, the display area size of each one image could be sometimes small, resulting in a decrease in the visibility of each individual image inside the display area.

SUMMARY

A certain aspect of the present disclosure is an image display method of displaying a first image and a second image in a display area, the second image being adjacent to the first image, comprising: performing display with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed.

Another aspect of the present disclosure is an image display method of displaying a first image and a second image in a display area, the second image being adjacent to the first image, comprising: performing display with switching between a first display mode and a second display mode, the first display mode being a mode in which the second image overlaps with the first image, and the second display mode being a mode in which the first image and the second image are displayed without any overlap therebetween.

A certain aspect of the present disclosure is an image display device that displays a first image and a second image in a display area, the second image being adjacent to the first image, comprising: a display unit that displays the first image and the second image in the display area; and a display control unit that causes the display unit to perform display in the display area with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed.

Another aspect of the present disclosure is an image display device that displays a first image and a second image in a display area, the second image being adjacent to the first image, comprising: a display unit that displays the first image and the second image in the display area; and a display control unit that causes the display unit to perform display with switching between a first display mode and a second display mode, the first display mode being a mode in which the second image displayed in the display area overlaps with the first image, and the second display mode being a mode in which the first image and the second image are displayed without any overlap therebetween.

A certain aspect of the present disclosure is a non-transitory computer-readable storage medium storing a display control program to be run on a computer, the computer commanding that a first image and a second image be displayed in a display area, the second image being adjacent to the first image, the display control program causing the computer to perform operations comprising: performing display with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed.

Another aspect of the present disclosure is a non-transitory computer-readable storage medium storing a display control program to be run on a computer, the computer commanding that a first image and a second image be displayed in a display area, the second image being adjacent to the first image, the display control program causing the computer to perform operations comprising: performing display with switching between a first display mode and a second display mode, the first display mode being a mode in which the second image overlaps with the first image, and the second display mode being a mode in which the first image and the second image are displayed without any overlap therebetween.

DESCRIPTION OF EXEMPLARY EMBODIMENTS

With reference to the accompanying drawings, some embodiments of the present disclosure will now be explained.

Figure 1:
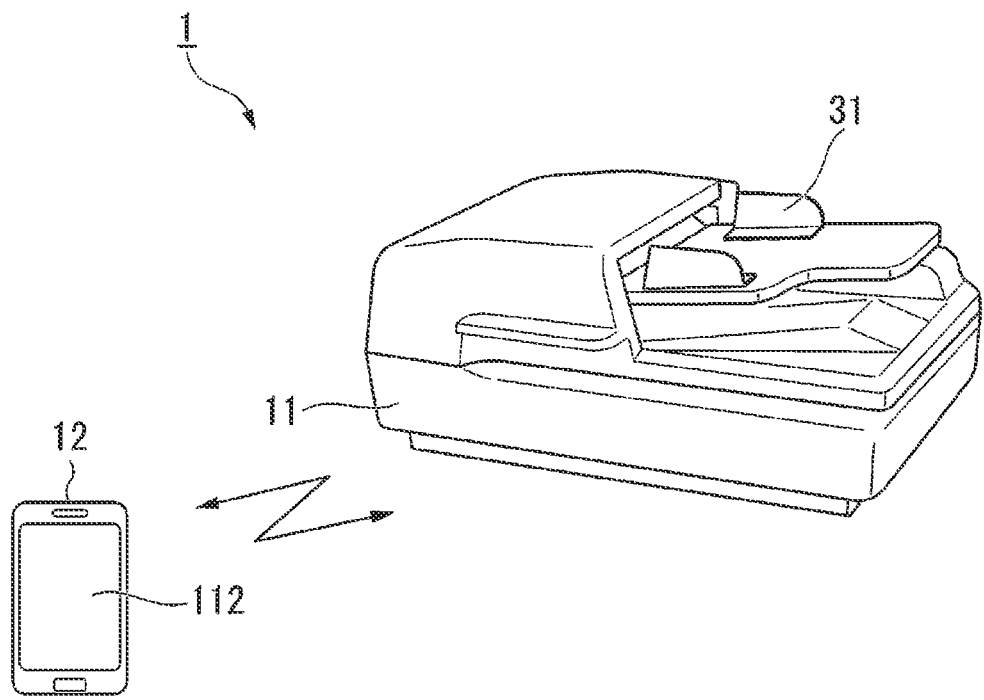
FIG. 1 is a diagram that illustrates an example of the schematic configuration of an image processing system.

FIG. 1 is a diagram that illustrates an example of the schematic configuration of an image processing system 1 according to an exemplary embodiment. The image processing system 1 includes an image processing device 11 and a mobile terminal device 12. The image processing device 11 and the terminal device 12 communicate with each other wirelessly.

The terminal device 12 is a handheld portable device carried by a user, for example, a tablet-type terminal device or a smartphone, etc. The terminal device 12 includes a display unit 112 that is a touch panel having a touch input function. The display unit 112 is a display. The terminal device 12 is operated by the user and displays various kinds of information on the display unit 112. The terminal device 12 controls image processing performed by the image processing device 11 via communication with the image processing device 11.

The image processing device 11 is controlled based on instructions, etc. received from the terminal device 12. The image processing device 11 performs image processing in accordance with the content of the control. The image processing device 11 has a scanner function. Using the scanner function, the image processing device 11 reads a plurality of images, and transmits data of the plurality of images read to the terminal device 12 wirelessly. The image processing device 11 is equipped with an automatic document feeder 31. The image processing device 11 automatically feeds sheets of paper placed on the automatic document feeder 31 and reads an image on each of the sheets of paper. The paper is A4-sized paper or A3-sized paper, for example. The number of the sheets may be any number, for example, one hundred.

The terminal device 12 receives the data of the plurality of images from the image processing device 11, and, based on the received data, displays a plurality of images on the display unit 112. The terminal device 12 receives an input of instructions corresponding to an operation performed by the user for the image displayed on the display unit 112, and performs processing corresponding to the inputted instructions. Taking a look at the image displayed on the display unit 112 of the terminal device 12 enables the user to confirm at a glance the image that is being processed by the image processing device 11 or to make edits, etc.

Figure 2:
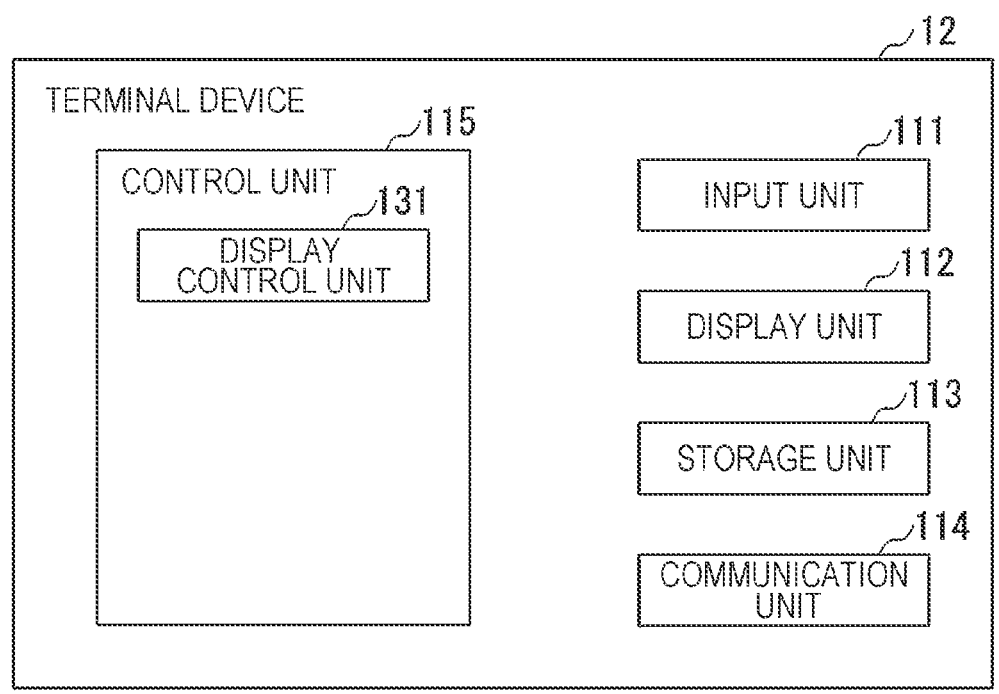
FIG. 2 is a diagram that illustrates an example of the functional blocks of a terminal device.

FIG. 2 is a diagram that illustrates an example of the functional blocks of the terminal device 12 according to an exemplary embodiment. The terminal device 12 includes an input unit 111, the display unit 112, a storage unit 113, a communication unit 114, and a control unit 115. The control unit 115 includes a display control unit 131. The input unit 111 and the display unit 112 are configured as a screen that has a touch input function.

The input unit 111 receives an input the content of which is based on a touch operation performed by the user on the screen. Specifically, the input unit 111 detects the contact and movement of a finger(s) of the user or a touch pen and accepts the operation corresponding to the detection result. The display unit 112 displays various kinds of information on the screen. The storage unit 113 stores various kinds of information. The information includes data of an original image that is to be displayed, a relevant image that is generated based on the original image, etc. The storage unit 113 is a set of memories that includes a ROM (Read Only Memory), a RAM (Random Access Memory), etc. The communication unit 114 communicates with the image processing device 11 wirelessly. The communication unit 114 may be called as a communication circuit, a communication port, or a communication interface.

The control unit 115 performs various kinds of processing and control. The control unit 115 is a controller that includes a CPU (Central Processing Unit). The display control unit 131, which is included in the control unit 115, controls processing of displaying various kinds of information on the display unit 112.

Various kinds of processing and control are performed by executing, by the CPU of the control unit 115, a control program stored in the storage unit 113. The control program includes a display control program for controlling display. The functions of the display control unit 131 are implemented by executing, by the CPU of the control unit 115, the display control program stored in the storage unit 113. The display control program may be a program of an application exclusive to the image processing device 11. The display control program may be pre-stored in the storage unit 113 of the terminal device 12. Alternatively, the terminal device 12 may download and install the display control program.

In the configuration of the terminal device 12 described above, the display control unit 131 is included in the control unit 115. However, instead of the above configuration, the functions of the display control unit 131 for controlling display may be implemented by a dedicated functional block separated from the control unit 115.

Display control performed in the terminal device 12 will now be explained. The communication unit 114 receives data of a plurality of images from the image processing device 11. The display control unit 131 acquires the data of the plurality of images transmitted from the image processing device 11. These images will be hereinafter referred to as original images. In accordance with their sequential order, these images are associated with page numbers that are serial numbers. The page numbers may be assigned in the terminal device 12. Alternatively, the page numbers may be assigned in the image processing device 11.

For these images, the display control unit 131 sets respective three-dimensional coordinate systems. Such a three-dimensional coordinate system is called as a local coordinate system. The local coordinate system is a three-dimensional orthogonal coordinate system.

Figure 3:
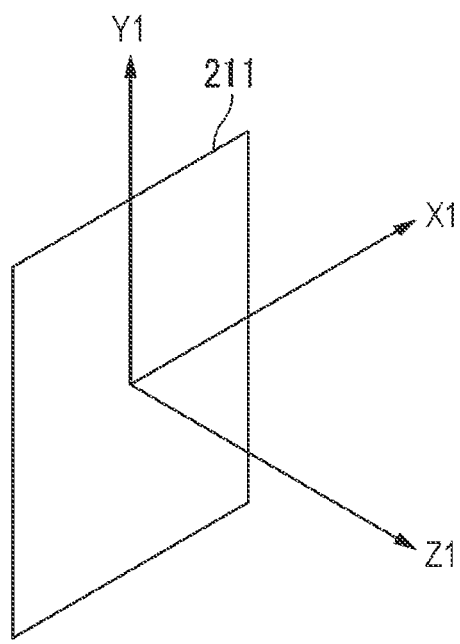
FIG. 3 is a diagram that illustrates an example of the local coordinate system of one image.

FIG. 3 is a diagram that illustrates an example of the local coordinate system of one image 211 according to an exemplary embodiment. A local coordinate system consisting of X1, Y1 and Z1 axes is set for the image 211. Respective local coordinate systems are set for a plurality of images. The arrangement of the local coordinate systems for the respective images may be any arrangement.

The display control unit 131 adjusts the arrangement of each of the plurality of images while taking the corresponding local coordinate system of each of them as a reference. On a three-dimensional coordinate system common to the plurality of images, the display control unit 131 arranges these images. Such a common three-dimensional coordinate system is called as a global coordinate system. The global coordinate system is a three-dimensional orthogonal coordinate system.

The display control unit 131 maps a total image in which the plural images are arranged on the global coordinate system onto a two-dimensional coordinate system, and specifies the result of the mapping as display data. The display data is pixel data. Each image of such display data is called as a thumbnail image. Such a two-dimensional coordinate system is called as a display coordinate system. The display coordinate system is a two-dimensional orthogonal coordinate system. The display area of the display data is called as a view port. Although a case where plural images are arranged on a global coordinate system and are displayed is described above, a single image may be arranged on a global coordinate system and be displayed. The thumbnail image is an image reduced in size from the original image.

Figure 4:
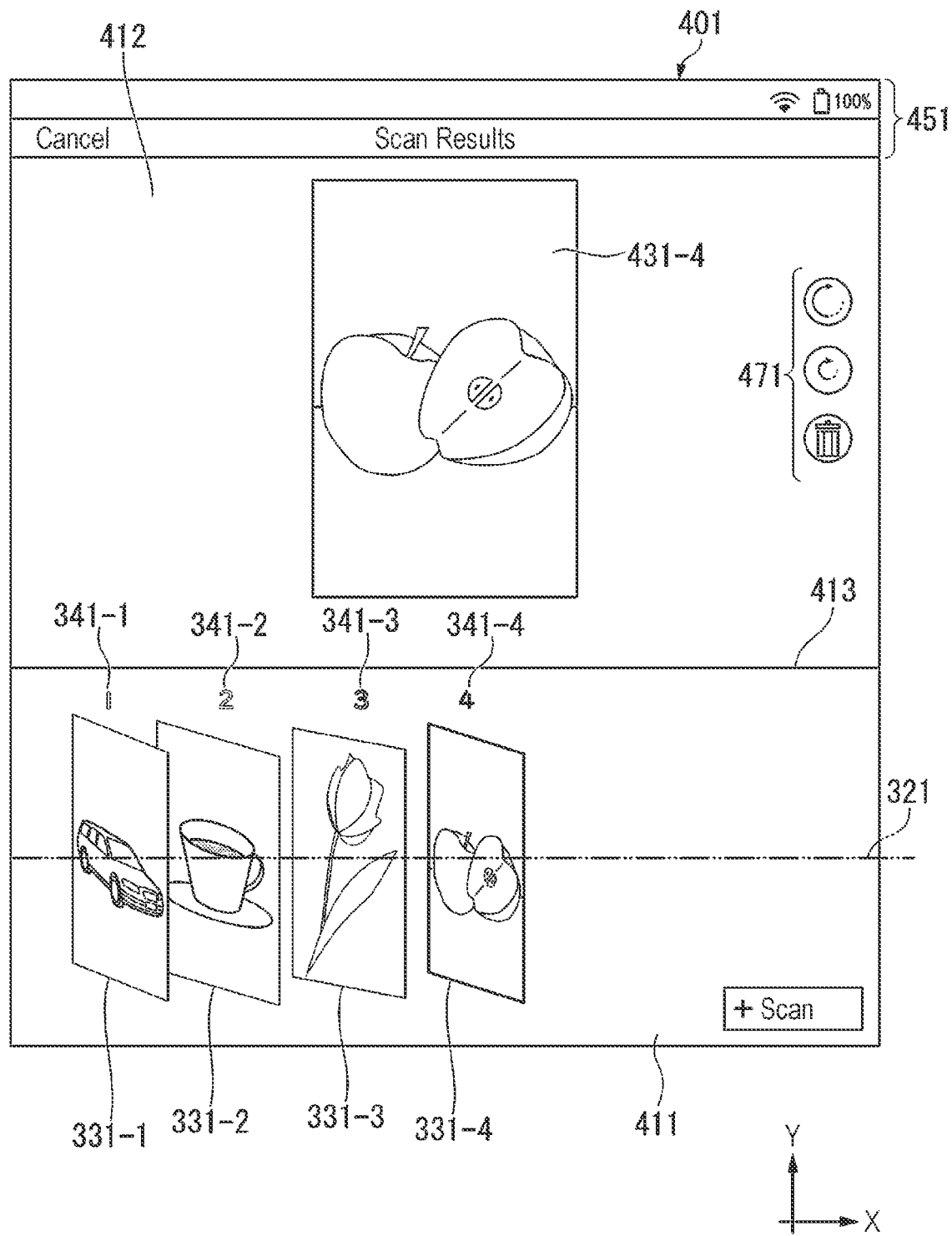
FIG. 4 is a diagram that illustrates an example of a first display screen.

A first embodiment will now be explained. FIG. 4 is a diagram that illustrates an example of a first display screen 401 according to an exemplary embodiment. A display coordinate system consisting of an X axis and a Y axis is shown in FIG. 4. When viewed by a user facing the screen of the display unit 112 of the terminal device 12, the direction toward the positive side along the X axis is defined as "rightward2, the direction toward the negative side along the X axis is defined as "leftward", the direction toward the positive side along the Y axis is defined as "vertically upward", and the direction toward the negative side along the Y axis is defined as "vertically downward". The arrangement of the display coordinate system on the screen may be any arrangement.

The first display screen 401 is an example of a display screen that is displayed by the display unit 112 of the terminal device 12. The display area of the first display screen 401 includes a first display area 411, a second display area 412, and a third display area 451. The inside of the display area excluding the third display area 451 is divided into the first display area 411 and the second display area 412.

In the third display area 451, the display control unit 131 displays the radio wave conditions of wireless communication and character information such as "Cancel" that is able to be operated by a user. Display in the third display area 451 by the display control unit 131 may be omitted.

Each of the first display area 411 and the second display area 412 is a rectangular area enclosed by sides parallel to the X axis and sides parallel to the Y axis. In FIG. 4, the side parallel to the X axis is longer than the side parallel to the Y axis for each of the first display area 411 and the second display area 412. However, the scope of the present disclosure is not limited to this example. When viewed along the Y axis, the first display area 411 is located on a relatively −Y side, and the second display area 412 is located on a relatively +Y side. The width of the side along the X axis of the first display area 411 is equal to the width of the side along the X axis of the second display area 412. The first display area 411 and the second display area 412 are arranged such that the +Y-side side of the first display area 411 and the −Y-side side of the second display area 412 perfectly overlap. Because of this arrangement, the first display area 411 and the second display area 412 as a whole constitute a rectangular display area. On the first display screen 401 illustrated in FIG. 4, the border between the first display area 411 and the second display area 412 is shown as a boundary axis 413. Display of the boundary axis 413 may be omitted.

In FIG. 4, plural thumbnail images 331 are arranged along a first axis 321 and displayed in the first display area 411. In the first display area 411, these thumbnail images 331 are arranged from the negative side toward the positive side along the X axis in the ascending order of page numbers.

The first axis 321 is a virtual axis and is not displayed actually. However, the first axis 321 may be displayed actually. In FIG. 4, the first axis 321 is parallel to the X axis and goes through the midpoint of the first display area 411 with respect to the direction parallel to the Y axis.

In FIG. 4, the plural thumbnail images 331, each denoted as an i-th thumbnail image 331-$i$ corresponding to its page number, are shown in the order of their page numbers. The ordinal number i is an integer that is not less than one. The maximum value P of this ordinal number corresponds to the number of the thumbnail images 331. A thumbnail image, when mentioned without individualization related to its page, will be hereinafter referred to as the thumbnail image 331. In FIG. 4, each i-th thumbnail image 331-$i$ is a rectangular image. The i-th thumbnail image 331-$i$ may be arranged such that its width along the Y axis is greater than its width along the X axis or may be arranged in any other orientation; the direction of arrangement may be changed.

The display control unit 131 performs thumbnail arrangement along the first axis 321 inside the first display area 411 such that an angle formed by an image plane and a display plane is relatively small for a k-th thumbnail image 331-$k$ corresponding to the k-th page and located closer to the center and such that, from the center to a predetermined number of images m, for a k+m-th thumbnail image 331-$k$+m located away from the center, an angle formed by an image plane and a display plane is larger than that of the k-th thumbnail image 331-$k$. The ordinal number k is an integer that is not less than one but not greater than P. The predetermined number m is an integer that is less than k. The "angle formed by an image plane and a display plane" means an angle formed by the Z axis perpendicular to the display plane and the Z1 axis of the i-th thumbnail image 331-$i$. At a region that is more distant from the center than the one at the predetermined number is, the display control unit 131 arranges and displays thumbnail images 331 at equal intervals along the first axis 321 inside the first display area 411. The position that is most distant from the center along the first axis 321, of the first display area 411, corresponds to each of the left edge and the right edge of the first display area 411.

Each of the plurality of thumbnail images 331 displayed is accompanied by a numeric image indicating its corresponding page number. In FIG. 4, an image of the page number of each i-th thumbnail image 331-$i$ is shown as an i-th page number image 341-$i$.

In the example illustrated in FIG. 4, the display control unit 131 displays four thumbnail images 331 inside the first display area 411, and there is no region of display at equal intervals for the four thumbnail images 331. On the first display screen 401 illustrated in FIG. 4, a fourth thumbnail image 331-4 corresponding to the fourth page, accompanied by a fourth page number image 341-4, is displayed near the center of the first display area 411 along the first axis 321. Toward the negative side of the X axis from the position near the center of the first display area 411 along the first axis 321, a third thumbnail image 331-3, . . . , the page numbers of which precede the fourth page, accompanied respectively by a third page number image 341-3, . . . , are displayed in the descending order of their page numbers. Similarly, if there are the fifth page and the subsequent pages, toward the positive side of the X axis from the position near the center of the first display area 411 along the first axis 321, a fifth thumbnail image 331-5, . . . , the page numbers of which succeed the fourth page, accompanied respectively by a fifth page number image 341-5, . . . , are displayed in the ascending order of their page numbers. A page number image, when mentioned without individualization related to its page, will be hereinafter referred to as the page number image 341.

On the local coordinate system of the i-th thumbnail image 331-$i$, the display control unit 131 adjusts the arrangement of the i-th page number image 341-$i$, in accordance with the arrangement of the i-th thumbnail image 331-$i$. The display control unit 131 generates display data for the display coordinate system, with the i-th thumbnail image 331-$i$ and the i-th page number image 341-$i$ included.

The display control unit 131 arranges and displays the i-th page number image 341-$i$ at a position on the +Y side with respect to the i-th thumbnail image 331-$i$. The display control unit 131 displays each i-th page number image 341-$i$ inside the first display area 411. The display control unit 131 displays each i-th page number image 341-$i$ such that no part of it is beyond the boundary axis 413 that is the +Y-side borderline of the first display area 411. In FIG. 4, the borderline is a line parallel to the X axis. The display control unit 131 may display some or all of the i-th page number images 341-$i$ such that they are partially or entirely beyond the boundary axis 413.

The display control unit 131 adjusts the concentration of display of the i-th page number image 341-$i$ on a page-by-page basis. The concentration may be adjusted by adjusting the degree of transparency. The lower the transparency is, the higher the concentration is. The higher the transparency is, the lower the concentration is. Depending on how the i-th thumbnail image 331-$i$ is displayed, the display control unit 131 may change one or more of factors as to how the i-th page number image 341-$i$ corresponding to the i-th thumbnail image 331-$i$ is displayed, such as the shape, size, orientation, concentration, arrangement position, display color, etc. of the i-th page number image 341-$i$.

In FIG. 4, the display control unit 131 arranges the i-th page number image 341-$i$ corresponding to the i-th thumbnail image 331-$i$ at a position on the +Y side with respect to the i-th thumbnail image 331-$i$. However, the scope of the present disclosure is not limited to this example. The display control unit 131 may arrange the i-th page number image 341-$i$ corresponding to the i-th thumbnail image 331-$i$ at a position on the -Y side, on the +X side, or on the -X side with respect to the i-th thumbnail image 331-$i$. In FIG. 4, the display control unit 131 arranges the i-th page number image 341-$i$ corresponding to the i-th thumbnail image 331-$i$ at a position outside the i-th thumbnail image 331-$i$. However, the scope of the present disclosure is not limited to this example. The display control unit 131 may arrange the i-th page number image 341-$i$ corresponding to the i-th thumbnail image 331-$i$ at a position inside the i-th thumbnail image 331-$i$.

In the example illustrated in FIG. 4, the plural thumbnail images 331 displayed in the first display area 411 have the same original image size as one another. However, the original images of these thumbnail images 331 may include original images having different sizes. In such a case, the display control unit 131 may display the thumbnail images 331 having different sizes corresponding to their original image sizes in the first display area 411. Alternatively, the display control unit 131 may perform processing for making the width of all of the thumbnail images 331 equal along either one or both of the X axis and the Y axis.

The first axis 321 described above is a straight line. However, the first axis 321 is not limited to a straight line. With respect to the X axis, the first axis 321 may be curved toward the +Y side from the center of the first display area 411 toward the +X side and may be curved toward the +Y side from the center of the first display area 411 toward the -X side. The first axis 321 may be X-axially symmetric with respect to the center of the first display area 411 between the +X side and the -X side.

In the second display area 412, the display control unit 131 displays an image corresponding to the i-th thumbnail image 331-$i$ that is one of the plurality of thumbnail images 331 displayed in the first display area 411. Such an image is called as an intermediate image. In FIG. 4, a fourth intermediate image 431-4 corresponding to the fourth thumbnail image 331-4 is displayed in the second display area 412. The intermediate image 431 is larger than the i-th thumbnail image 331-$i$ corresponding to the intermediate image 431. The intermediate image 431 may be a reduced image that is smaller than the original image. The intermediate image 431 may be an enlarged image that is larger than the original image. The intermediate image 431 may have the same size as that of the original image. An intermediate image, when mentioned without individualization related to its page, will be hereinafter referred to as the intermediate image 431.

The i-th thumbnail image 331-$i$ for which the i-th intermediate image 431-$i$ is displayed is the k-th thumbnail image 331-$k$ that is located near the center of the first display area 411 along the first axis 321 and is in a state of being selected in the first display area 411. The selection is made by a user operation in the first display area 411 or the second display area 412.

In the example illustrated in FIG. 4, the display control unit 131 controls how the i-th page number image 341-$i$ is displayed. However, the display control unit 131 may perform control that makes the i-th page number image 341-$i$ displayed in the same way. Display of the i-th page number image 341-$i$ by the display control unit 131 may be omitted.

Upon detecting that a predetermined operation is performed by the user on the terminal device 12, the display control unit 131 performs control for changing the image displayed in the second display area 412. Upon detecting a swipe operation performed by the user on the intermediate image 431 displayed in the second display area 412, the display control unit 131 commands that the intermediate image of the next page that is adjacent to the displayed intermediate image 431 be displayed in the second display area 412. Under the control by the display control unit 131, if the detected operation is an operation of moving the user's finger, etc. from the +X side toward the -X side, the intermediate image 431 of the page incremented in page number by one is displayed on the first display screen 401. If the detected operation is an operation of moving the user's finger, etc. from the -X side toward the +X side, the intermediate image 431 of the page decremented in page number by one is displayed on the first display screen 401.

Upon detecting a touch operation performed by the user of touching a thumbnail image 331 that is not the currently-selected i-th thumbnail image 331-$i$ among the plurality of thumbnail images 331 displayed in the first display area 411, the display control unit 131 changes display into a state in which the touched thumbnail image 331 is currently displayed, and commands that the intermediate image 431 that corresponds to the touched thumbnail image 331 be displayed in the second display area 412.

In FIG. 4, under the control by the display control unit 131, a predetermined group of icons 471 is displayed in the second display area 412. When one of the icons in the group 471 is operated by the user, for example, when tapped with a finger, the display control unit 131 accepts instructions corresponding to the operation. The display control unit 131 may command that any icon(s) be displayed in either one or both of the first display area 411 and the second display area 412. The display control unit 131 may cause the display unit 112 to display a predetermined menu when a predetermined area of the display unit 112 is operated by the user, for example, when tapped with a finger. When a predetermined area on the menu is operated by the user, for example, when tapped with a finger, the display control unit 131 accepts instructions corresponding to the operation.

Figure 5:
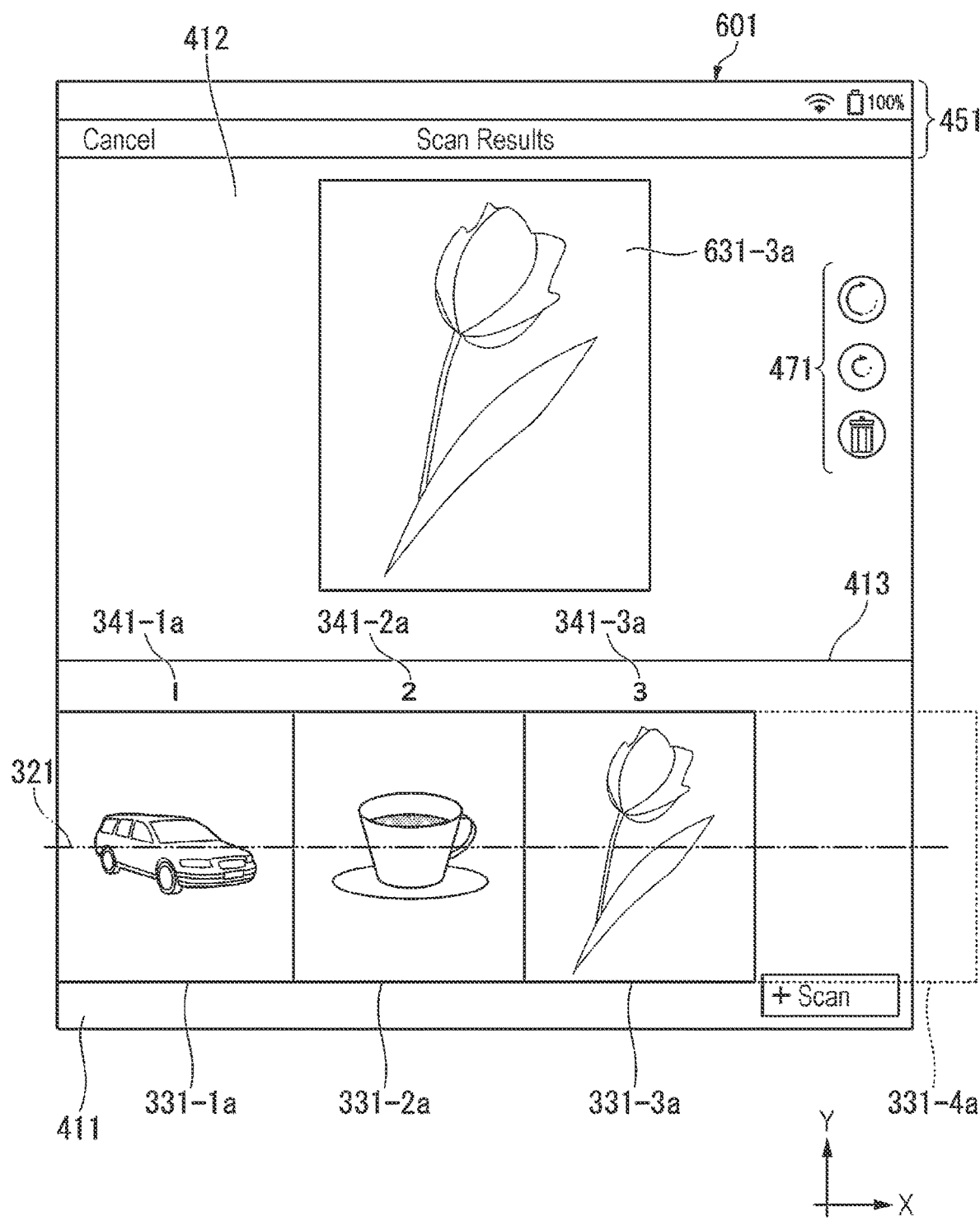
FIG. 5 is a diagram that illustrates an example of a second display screen.

The display control unit 131 performs switching between a first display mode, in which three-dimensional image display is used, and a second display mode, in which two-dimensional image display is used. The display control unit 131 performs switching into the first display mode when the number of the plural thumbnail images 331 that are to be displayed is equal to or greater than a predetermined threshold. The display control unit 131 performs switching into the second display mode when the number of the plural thumbnail images 331 that are to be displayed is less than the predetermined threshold. The display example illustrated in FIG. 4 is a display example of the first display mode. The display example illustrated in FIG. 5 is a display example of the second display mode. In the example illustrated in FIGS. 4 and 5, the predetermined threshold is four.

FIG. 5 is a diagram that illustrates an example of a second display screen 601 according to an exemplary embodiment. The same display coordinate system as that of FIG. 4 is shown in FIG. 5. The difference between the second display screen 601 and the first display screen 401, the latter of which is illustrated in FIG. 4, lies in how the plural thumbnail images 331 are displayed in the first display area 411.

In FIG. 5, the display control unit 131 commands that a plurality of thumbnail images 331, specifically, a first-a thumbnail image 331-1a to a third-a thumbnail image 331-3a, be displayed in the first display area 411. The display control unit 131 commands that a first-a page number image 341-1a to a third-a page number image 341-3a be displayed in the first display area 411. The first-a page number image 341-1a to the third-a page number image 341-3a are images of page numbers corresponding to the first-a thumbnail image 331-1a to the third-a thumbnail image 331-3a respectively. In FIG. 5, the third-a thumbnail image 331-3a in the first display area 411 is in a selected state, and a third-a intermediate image 631-3a corresponding to the third-a thumbnail image 331-3a is displayed in the second display area 412.

FIG. 5 is different from FIG. 4 in that the image plane of every thumbnail image 331 is arranged in parallel with the display plane. In FIG. 5, if display size is disregarded, every thumbnail image 331 is displayed as if the corresponding original image were viewed from a frontal viewpoint.

In FIG. 5, the display control unit 131 commands that the first-a thumbnail image 331-1a to the third-a thumbnail image 331-3a should be displayed such that they are arranged next to one another sequentially along the first axis 321 without any space between them and without any overlap. In the example illustrated in FIG. 5, the first display area 411 has the following size: if four thumbnail images 331, four being the threshold, are attempted to be displayed in the first display area 411 in the second display mode, a part of one of the four thumbnail images 331 will lie off-screen, meaning that the part of the one will be located outside the edge, of the first display area 411, parallel to the Y axis. However, the scope of the present disclosure is not limited to this example. In FIG. 5, a fourth-a thumbnail image 331-4a is virtually illustrated. If four thumbnail images 331 are displayed in the second display mode, the fourth-a thumbnail image 331-4a will be located partially outside the first display area 411.

As a different condition other than the above condition for switching between the first display mode and the second display mode, a condition using a sum of the respective predetermined lengths of the plural thumbnail images 331 that are to be displayed may be used. The sum is a total value of the widths of the plurality of thumbnail images 331. The width is a width corresponding to each length in the direction along the first axis 321 of the first display area 411. The display control unit 131 performs switching into the first display mode when the sum of the widths is equal to or greater than a predetermined threshold. The display control unit 131 performs switching into the second display mode when the sum of the widths is less than the predetermined threshold.

In FIGS. 4 and 5, the display control unit 131 commands that an image of characters "+Scan" be displayed in the first display area 411. The image serves as an operation button for adding an image read using the scanner function. The display control unit 131 adds one thumbnail image 331 so as to increase the number of the thumbnail images 331 displayed in the first display area 411 by one when this operation button is tapped, etc. with a finger by the user. An operation button for deleting an image read using the scanner function may be displayed, though not illustrated in FIGS. 4 and 5. In this case, the display control unit 131 deletes one thumbnail image 331 so as to decrease the number of the thumbnail images 331 displayed in the first display area 411 by one when this operation button is tapped, etc. with a finger by the user.

In the example described above, the display control unit 131 uses the threshold to determine whether to perform switching into the first display mode or the second display mode. However, the display control unit 131 may perform computation using a predetermined arithmetic equation and determine based on the result of the computation whether to perform switching into the first display mode or the second display mode.

Figure 6:
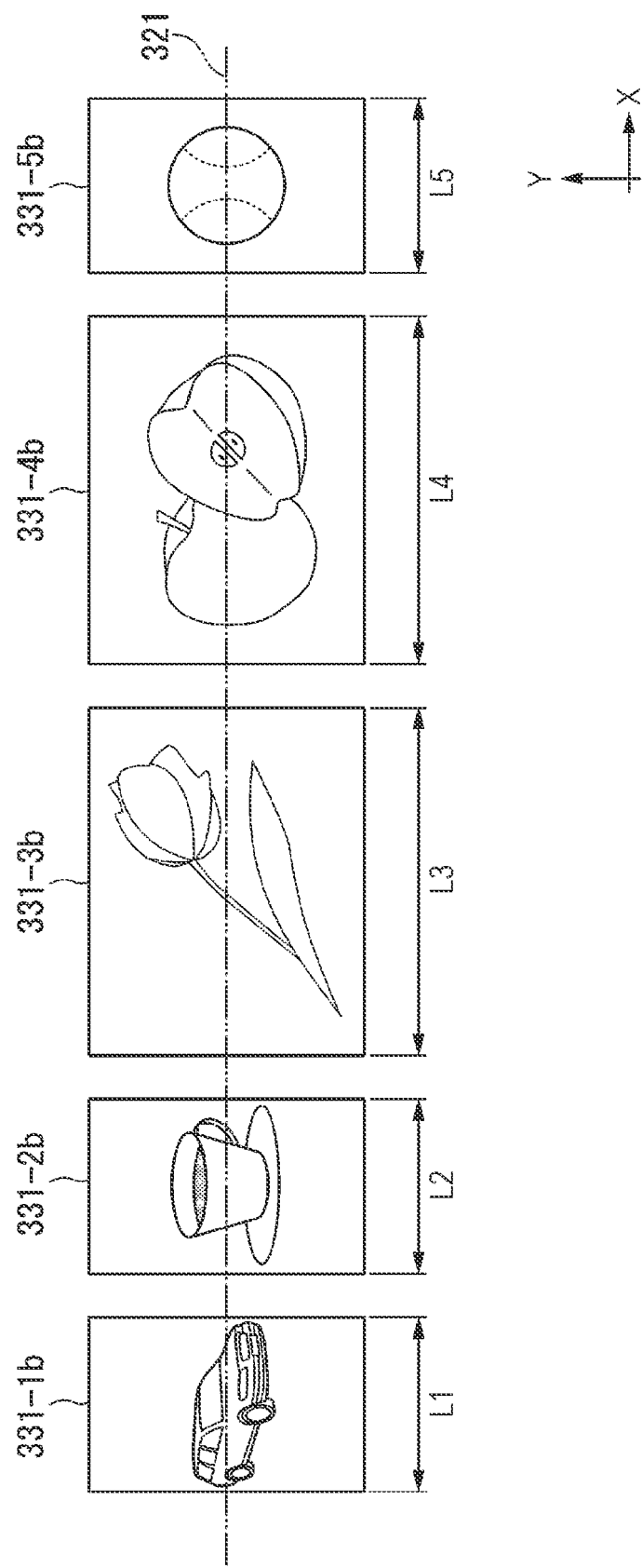
FIG. 6 is a diagram that illustrates an example of the widths of a plurality of images.

FIG. 6 is a diagram that illustrates an example of the widths of a plurality of images according to an exemplary embodiment. A display coordinate system is shown in FIG. 6. A first-b image 331-1b to a fifth-b image 331-5b, which are five thumbnail images 331, are illustrated in FIG. 6. The first-b image 331-1b to the fifth-b image 331-5b have widths of L1 to L5 respectively. The display control unit 131 calculates the sum of these widths, (L1+L2+L3+L4+L5), compares the sum with a predetermined threshold, and, based on the result of the comparison, performs switching into the first display mode or the second display mode.

As the width mentioned above, the width of the original image of each of the first-b image 331-1b to the fifth-b image 331-5b may be used. In this case, the width is a value calculated by, based on the magnification between the size of the original image and the size of the thumbnail image 331, converting the width of the thumbnail image 331 along the X axis inside the first display area 411 into the width of the original image corresponding to the thumbnail image 331. In the example illustrated in FIG. 6, the widths of the first-b image 331-1b to the fifth-b image 331-5b in a state in which the image plane of each of them is oriented toward the user are used. However, the widths in any other state may be used.

Figure 7:
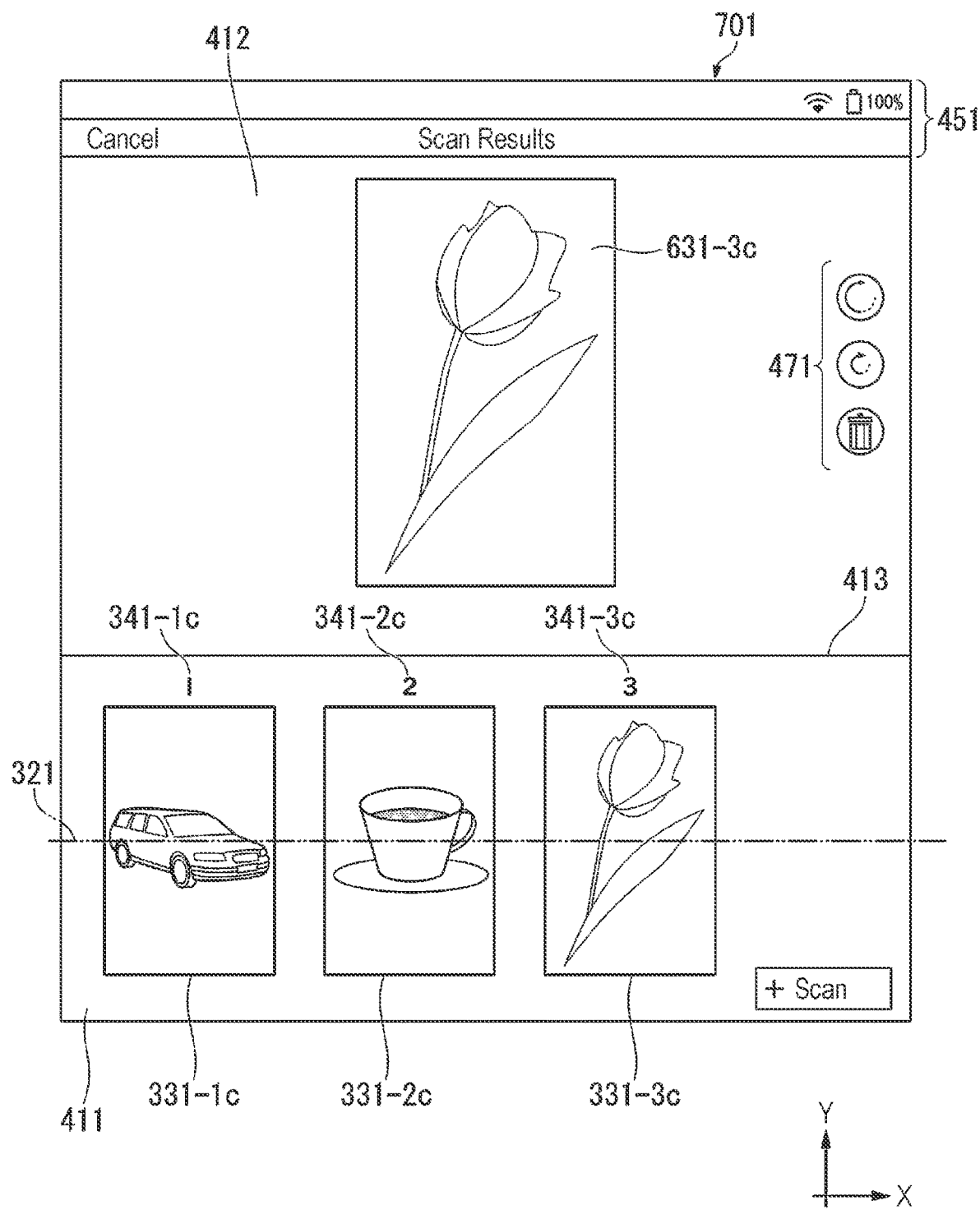
FIG. 7 is a diagram that illustrates an example of a third display screen.

FIG. 7 is a diagram that illustrates an example of a third display screen 701 according to an exemplary embodiment. The same display coordinate system as that of FIG. 5 is shown in FIG. 7. The difference between the third display screen 701 and the second display screen 601, the latter of which is illustrated in FIG. 5, lies in how the plural thumbnail images 331 are displayed in the first display area 411.

In FIG. 7, the display control unit 131 commands that a plurality of thumbnail images 331, specifically, a first-c thumbnail image 331-1c to a third-c thumbnail image 331-3c, be displayed in the first display area 411. The display control unit 131 commands that a first-c page number image 341-1c to a third-c page number image 341-3c be displayed in the first display area 411. The first-c page number image 341-1c to the third-c page number image 341-3c are images of page numbers corresponding to the first-c thumbnail image 331-1c to the third-c thumbnail image 331-3c respectively. The display control unit 131 commands that a third-c intermediate image 631-3c be displayed in the second display area 412.

In FIG. 7, the display control unit 131 commands that the first-c thumbnail image 331-1c to the third-c thumbnail image 331-3c should be displayed such that they are arranged next to one another at intervals sequentially along the first axis 321. The third display screen 701 illustrated in FIG. 7 is an example of a screen displayed in the second display mode and may be used in place of the second display screen 601 illustrated in FIG. 5.

Figure 8:
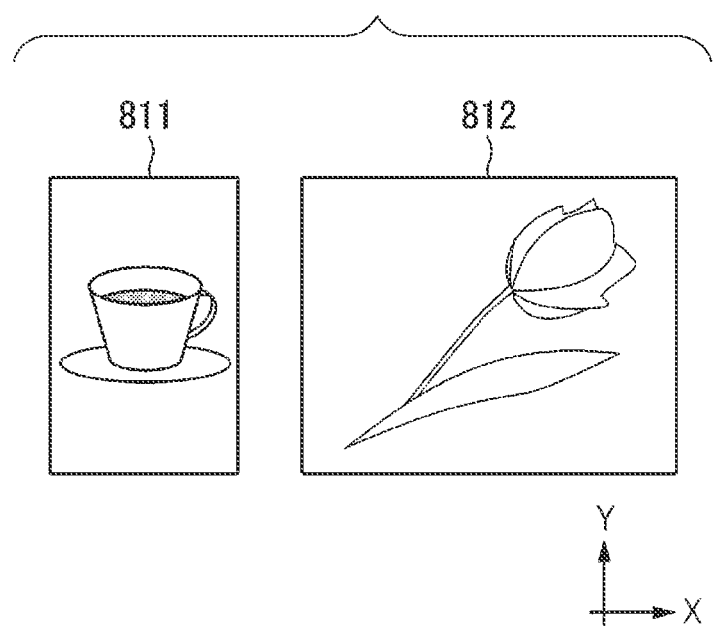
FIG. 8 is a diagram for explaining image width adjustment.
Figure 9:
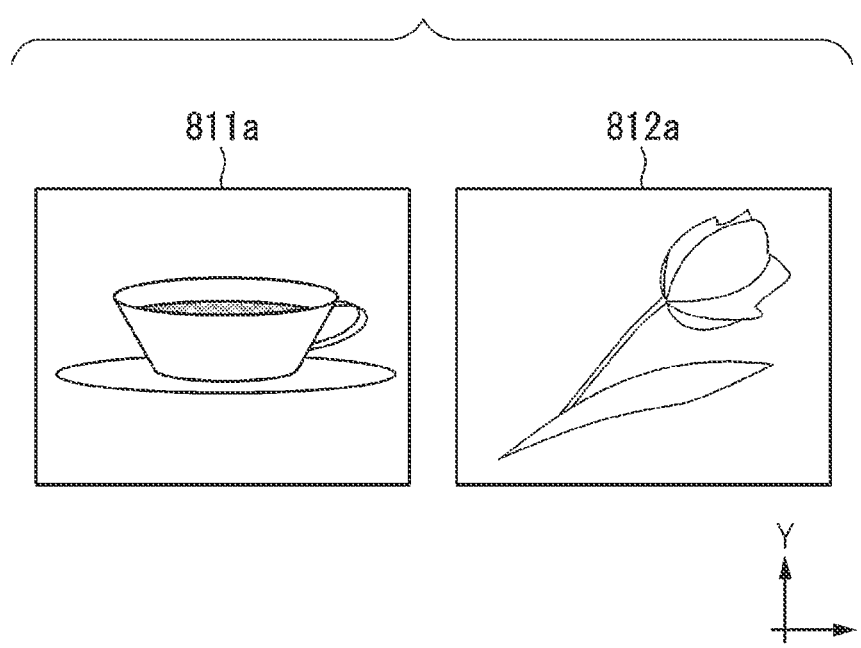
FIG. 9 is a diagram for explaining image width adjustment.

With reference to FIGS. 8 and 9, the adjustment of the width of the thumbnail image 331 displayed in the first display area 411 will now be explained. FIGS. 8 and 9 are diagrams for explaining image width adjustment according to an exemplary embodiment. The same display coordinate system as that of FIG. 5 is shown in each of FIGS. 8 and 9.

A first target image 811 having an A4 size and a second target image 812 having an A3 size are illustrated in FIG. 8. Each of these images is the thumbnail image 331 displayed in the first display area 411. The first target image 811 is arranged such that the width of a side perpendicular to the first axis 321 is greater than the width of a side parallel to the first axis 321. The second target image 812 is arranged such that the width of a side parallel to the first axis 321 is greater than the width of a side perpendicular to the first axis 321.

In this case, if the display control unit 131 commands that these thumbnail images 331 should be displayed without any adjustment of their original image width for the side parallel to the X axis, the widths of these thumbnail images 331 will be different from each other. The display control unit 131 may perform adjustment processing for making the width of the first target image 811 equal to the width of the second target image 812.

The first target image 811 after the adjustment of the width and the second target image 812 are illustrated in FIG. 9. In FIGS. 8 and 9, the horizontal enlargement conversion of the first target image 811 into a first-a target image 811a makes its width equal to the width of the second target image 812. The second-a target image 812a in FIG. 9 is the same as the second target image 812 in FIG. 8. By performing the width adjustment processing described above, the display control unit 131 may make the widths of the plurality of thumbnail images 331 displayed in the first display area 411 equal to one another.

In the example described above, the display control unit 131 makes an enlarging adjustment to make the width of the narrower thumbnail image 331 equal to the width of the wider thumbnail image 331. However, the display control unit 131 may make a size-reducing adjustment to make the width of the wider thumbnail image 331 equal to the width of the narrower thumbnail image 331. In the example illustrated in FIGS. 8 and 9, the first target image 811 and the second target image 812 are displayed in a state in which the image plane of each of them is oriented toward the user. However, width adjustment processing in a predetermined direction may be performed when either one or both of these images are displayed in any other state.

As explained above with reference to FIGS. 4, 5, and 7, the terminal device 12 displays the plurality of thumbnail images 331 in the first display area 411 with switching between the first display mode and the second display mode. In the first display mode, the terminal device 12 may display the plurality of thumbnail images 331 such that some or all of the thumbnail images 331 overlap with others of them. The terminal device 12 displays the plurality of thumbnail images 331 along the first axis 321.

In FIGS. 4 and 5, based on the number of the plural thumbnail images 331 that are to be displayed, the terminal device 12 performs switching between the first display mode and the second display mode. In FIGS. 4 and 5, the terminal device 12 uses a fixed value as the threshold regarding the number of the plural thumbnail images 331 that are to be displayed.

In FIGS. 8 and 9, the terminal device 12 enlarges the first target image 811 in the direction of the first axis 321 of the first display area 411 to make the width of the first target image 811 equal to the width of the second target image 812. In FIG. 6, based on the sum of the widths, parallel to the first axis 321, of the plurality of thumbnail images 331 displayed in the first display area 411, the terminal device 12 performs switching between the first display mode and the second display mode. The terminal device 12 may perform switching between the first display mode and the second display mode based on instructions given by the user.

As explained above, the terminal device 12 of the image processing system 1 according to the present embodiment implements an image display method in which the plural thumbnail images 331 are arranged in a predetermined direction and are displayed, has the first display mode, in which the plural thumbnail images 331 are displayed as three-dimensional images, and the second display mode, in which the plural thumbnail images 331 are displayed as two-dimensional images, and is able to switch display between these two modes. Having the two display modes, the terminal device 12 is able to switch display therebetween depending on a situation and is therefore able to perform display that is more suited for the user's preference or the state of the group of images that are to be displayed.

The terminal device 12 may arrange the thumbnail images 331 one after another inside the first display area 411 in the second display mode first and then may switch display into the first display mode if the number of the thumbnail images 331 has become too large to be fully displayed inside the first display area 411. Conversely, if the number of the thumbnail images 331 that are to be displayed has become small enough to be fully arranged two-dimensionally while display in the first display mode is being performed, the terminal device 12 switches the display into the second display mode so as to arrange and display the thumbnail images 331 two-dimensionally inside the first display area 411.

When the thumbnail images 331 are displayed in the first display mode, higher view-ability for a case of many pages can be obtained. However, if the document that is to be displayed contains just three pages or so, such an effect of simultaneous view-ability obtained by rotated overlapping arrangement of the thumbnail images 331 can be obtained even if they are displayed two-dimensionally. Therefore, in related art, in such a case, the rotated orientation of the thumbnail images 331 could result in loss of details as compared with two-dimensional display. The terminal device 12 performs display in the second display mode if the thumbnail images 331 will be entirely arranged inside the first display area 411 when the thumbnail images 331 are displayed two-dimensionally. Therefore, when the number of pages is small, the terminal device 12 is able to display the thumbnail images 331 inside the first display area 411 such that the thumbnail images 331 are oriented toward the user, resulting in higher view-ability.

A second embodiment will now be explained. For the same content of disclosure as that of the first embodiment, a detailed explanation is omitted. The same reference numerals as those used in the description of the first embodiment above are assigned to components that are the same as those of the first embodiment.

Figure 10:
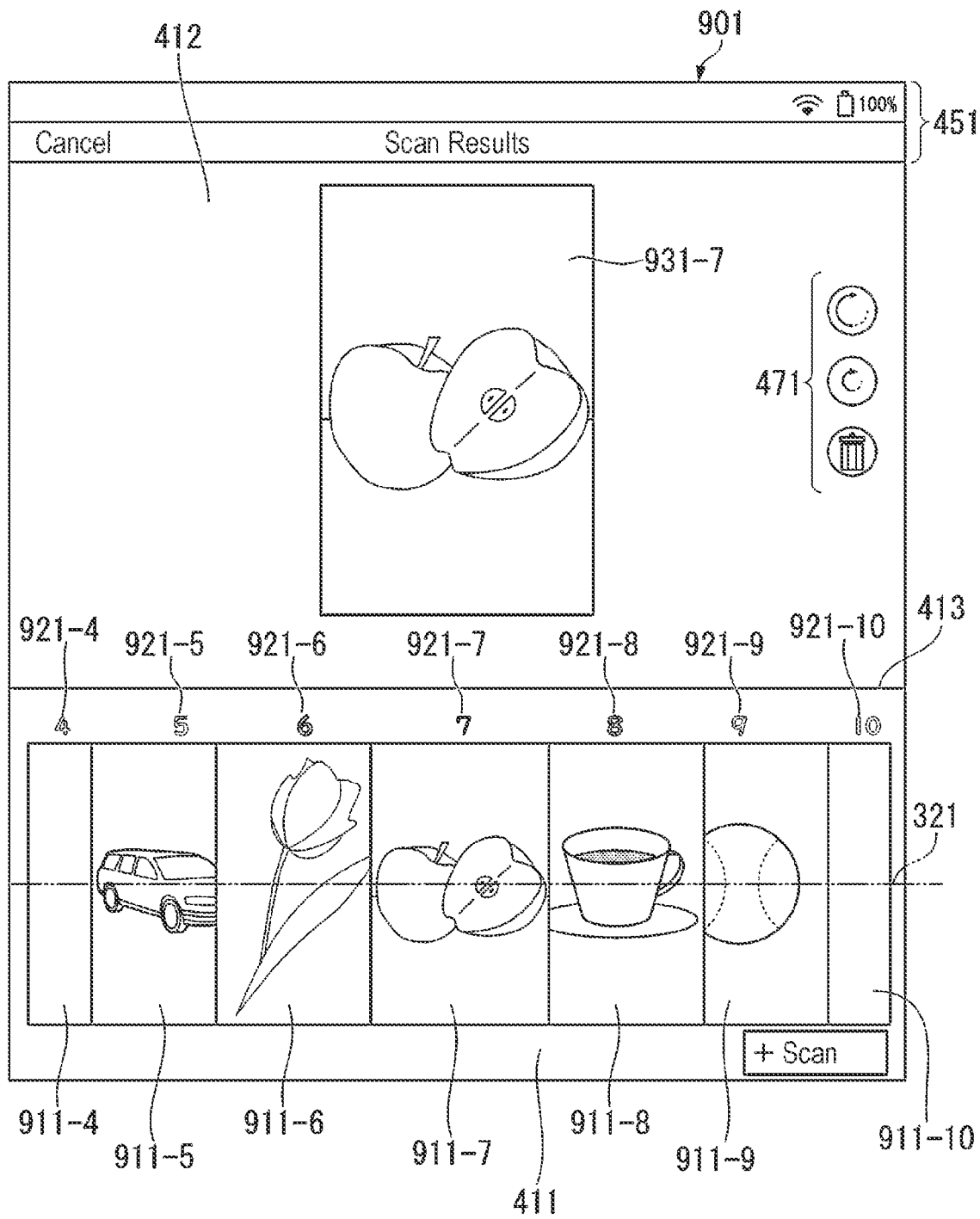
FIG. 10 is a diagram that illustrates an example of a fourth display screen.

FIG. 10 is a diagram that illustrates an example of a fourth display screen 901 according to an exemplary embodiment. The same display coordinate system as that of FIG. 4 is shown in FIG. 10. The difference between the fourth display screen 901 and the first display screen 401, the latter of which is illustrated in FIG. 4, lies in how the plural thumbnail images 331 are displayed in the first display area 411.

The fourth display screen 901 is another example of a screen displayed in the first display mode. In the first display mode of the second embodiment, the display control unit 131 does not perform three-dimensional image display but performs two-dimensional image display; however, the plurality of thumbnail images 331 is displayed with at least a partial overlap. Display in the second display mode is the same as display illustrated in FIG. 5 or display illustrated in FIG. 7.

In FIG. 10, the display control unit 131 displays each j-th thumbnail image 911-j as an example of the plurality of thumbnail images 331 inside the first display area 411. The ordinal number j is an integer that is not less than one. The maximum value P2 of this ordinal number corresponds to the number of the thumbnail images 911. On the fourth display screen 901 illustrated in FIG. 10, a fourth thumbnail image 911-4 to a tenth thumbnail image 911-10 are displayed. The display control unit 131 displays each j-th page number image 921-j corresponding to the j-th thumbnail image 911-j inside the first display area 411. On the fourth display screen 901 illustrated in FIG. 10, a fourth page number image 921-4 to a tenth page number image 921-10, which are images of page numbers corresponding to the fourth thumbnail image 911-4 to the tenth thumbnail image 911-10 respectively, are displayed. In the example illustrated in FIG. 10, the display control unit 131 does not cause third and preceding thumbnail image 911-3, . . . and eleventh and succeeding thumbnail image 911-11, . . . to be displayed in the first display area 411. However, these pages also may be displayed.

In FIG. 10, the display control unit 131 commands that the fourth thumbnail image 911-4 to the tenth thumbnail image 911-10 should be displayed such that they are arranged next to one another with a partial overlap sequentially along the first axis 321.

In FIG. 10, the display control unit 131 commands that a seventh intermediate image 931-7, which is an intermediate image for a seventh page that is in a selected state, be displayed in the second display area 412. An intermediate image, when mentioned without individualization related to its page, will be hereinafter referred to as the intermediate image 931.

As explained above with reference to FIG. 10, as display in the first display mode, the terminal device 12 may display the plurality of thumbnail images 911 in the first display area 411 such that the thumbnail images 911 located adjacent to each other overlap. A thumbnail image, when mentioned without individualization related to its page, is herein referred to as the thumbnail image 911. As display in the second display mode, the terminal device 12 displays the plurality of thumbnail images 911 without any overlap therebetween. The mutually-adjacent sides of the thumbnail images 911 located next to each other may be at the same position in alignment with each other as illustrated in FIG. 5. Alternatively, these mutually-adjacent sides may be spaced apart from each other as illustrated in FIG. 7.

Having the two display modes, the terminal device 12 of the image processing system 1 according to the present embodiment is able to switch display therebetween depending on a situation and is therefore able to perform display that is more suited for the user's preference or the state of the group of images that are to be displayed, similarly to the first embodiment.

The description of the foregoing embodiments has been given regarding the scanner function of the image processing device 11. However, the image processing device 11 may have any other function. For example, the image processing device 11 may have a print function. The terminal device 12 controls printing performed by the image processing device 11, receives data regarding images that are to be printed, and causes the display unit 112 to display the data regarding the images. The image processing device 11 may have a plurality of functions such as a scanner function and a print function. The image processing device 11 may be a multi-function printer.

In the foregoing embodiments, a case where the terminal device 12 is a mobile terminal device has been described. However, the terminal device 12 may be an installed-type device. The terminal device 12 may be various kinds of a device having a screen such as a display. The terminal device 12 may be called as a viewer, etc.

The image processing device 11 may be a server device that provides data of images stored in a database, etc. to the terminal device 12. The data of the images may be electronic book data.

A single display area may be used as the display area of the display unit 112 of the terminal device 12. Instead of a single display area, two display areas such as the first display area 411 and the second display area 412 may be used separately. Alternatively, three or more display areas may be used separately. When plural display areas are used on the terminal device 12, the arrangement of these display areas is not specifically limited. When viewed by a user facing the screen of the terminal device 12, these display areas may be arranged horizontally or vertically. Alternatively, any other arrangement may be used. The position of the first display area 411 and the position of the second display area 412 on the terminal device 12 may be reversed.

Although a case where a single intermediate image 431 is displayed in the second display area 412 has been described, two or more intermediate images 431 may be displayed in some instances in the second display area 412.

Although a case where the display control unit 131 of the terminal device 12 controls various kinds of display has been described, similar display control may be performed in the image processing device 11. The image processing device 11 controls display on a control panel provided on the image processing device 11 and configured to perform display, an external display, or a remote display, etc.

Although a case where the display control unit 131 generates display data using local coordinate systems, a global coordinate system, and display coordinate systems has been described, the scope of the present disclosure is not limited to this example. Any method may be used for generating display data.

Configuration examples regarding the foregoing embodiments are described below.

The terminal device 12 of the image processing system 1 according to an exemplary embodiment implements the following image display method: An image display method of displaying a first image and a second image in a display area, the second image being adjacent to the first image, comprising: performing display with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed.

The mode of display illustrated in FIG. 4 is an example of the first display mode. In FIG. 4, two thumbnail images 331 that are adjacent to each other and are displayed in the first display area 411, for example, the first thumbnail image 331-1 and the second thumbnail image 331-2, are an example of the first image and an example of the second image respectively. The mode of display illustrated in FIG. 5 is an example of the second display mode. In FIG. 5, two thumbnail images 331 that are adjacent to each other and are displayed in the first display area 411, for example, the first-a thumbnail image 331-1$a$ and the second-a thumbnail image 331-2$a$, are an example of the first image and an example of the second image respectively. The mode of display illustrated in FIG. 7 is another example of the second display mode.

In the image display method, in the first display mode, the first image displayed as the three-dimensional image and the second image displayed as the three-dimensional image are displayed in an overlapping manner, and in the second display mode, the first image displayed as the two-dimensional image and the second image displayed as the two-dimensional image are displayed without any overlap therebetween. In FIG. 4, in the first display mode, the first thumbnail image 331-1 and the second thumbnail image 331-2 are displayed in a state in which they partially overlap with each other. Some thumbnail images 331, as a part of the plurality of thumbnail images 331, may be displayed in an overlapping manner. Alternatively, all of the plurality of thumbnail images 331 may be displayed in an overlapping manner. The overlapping of the first image displayed as a three-dimensional image and the second image displayed as a three-dimensional image is not always necessary.

In the image display method, a plurality of images different from the first image and different from the second image is displayed, in the first display mode, the first image displayed as the three-dimensional image, the second image displayed as the three-dimensional image, and the plurality of images displayed as three-dimensional images are arranged along an axis, and in the second display mode, the first image displayed as the two-dimensional image, the second image displayed as the two-dimensional image, and the plurality of images displayed as two-dimensional images are arranged along the axis. In FIGS. 4, 5, and 7, the plural thumbnail images 331 are arranged along the first axis 321. The plurality of images may be displayed in any other manner.

In the image display method, when a number of the first image, the second image, and the plurality of images is greater than a pre-determined number, the first image displayed as the three-dimensional image, the second image displayed as the three-dimensional image, and the plurality of images displayed as the three-dimensional images are displayed in the first display mode, and when the number of the first image, the second image, and the plurality of images is less than the pre-determined number, the first image displayed as the two-dimensional image, the second image displayed as the two-dimensional image, and the plurality of images displayed as the two-dimensional images are displayed in the second display mode. A case where such a configuration is used is illustrated in FIGS. 4 and 5. If the number of the images that are to be displayed is equal to the pre-determined number, the first display mode may be used, or the second display mode may be used. The display may be switched between the first display mode and the second display mode based on a different condition other than the above condition.

In the image display method, the pre-determined number is not changed when the first image is an image whose width along the axis is less than a width of the second image along the axis In FIGS. 4 and 5, the pre-determined number is fixed. In FIGS. 4 and 5, both for an axis along which the plural thumbnail images 331 are arranged and for an axis along which the width of the first image and the width of the second image are defined, the first axis 321 is used as a common axis. However, these axes may be different from each other. Instead of the pre-determined number, a variable number may be used.

In the image display method, the width of the first image along the axis is increased by enlarged display so as to become equal to the width of the second image along the axis. In FIGS. 8 and 9, the first target image 811 is an example of the first image before enlargement, the first-a target image 811$a$ is an example of the first image after enlargement, and the second target image 812 is an example of the second image. Such enlargement is not always necessary.

In the image display method, when a sum, along the axis, of a width of the first image displayed as the two-dimensional image, a width of the second image displayed as the two-dimensional image, and widths of the plurality of images displayed as the two-dimensional images are greater than a pre-determined length, the first image displayed as the three-dimensional image, the second image displayed as the three-dimensional image, and the plurality of images displayed as the three-dimensional images are displayed in the first display mode, and when the sum, along the axis, of the width of the first image displayed as the two-dimensional image, the width of the second image displayed as the two-dimensional image, and the widths of the plurality of images displayed as the two-dimensional images are less than the pre-determined length, the first image displayed as the two-dimensional image, the second image displayed as the two-dimensional image, and the plurality of images displayed as the two-dimensional images are displayed in the second display mode. A case where such a configuration is used is illustrated in FIG. 6. In FIG. 6, the first axis 321 is an example of a second axis; namely, the first axis 321 serves as both of the first axis and the second axis. However, the first axis and the second axis may be different from each other. The display may be switched between the first display mode and the second display mode based on a different condition other than the above condition.

In the image display method, based on instructions given by a user, the display is switched between the first display mode and the second display mode. In FIGS. 4 and 5, the terminal device 12 is able to perform switching between the first display mode and the second display mode based on instructions given by the user. A configuration in which the switching between the first display mode and the second display mode is not performed based on instructions given by the user may be used.

Also provided is an image display method of displaying a first image and a second image in a display area, the second image being adjacent to the first image, comprising: performing display with switching between a first display mode and a second display mode, the first display mode being a mode in which the second image overlaps with the first image, and the second display mode being a mode in which the first image and the second image are displayed without any overlap therebetween. The mode of display illustrated in FIG. 10 is an example of the first display mode. The mode of display illustrated in FIG. 5 or FIG. 7 is an example of the second display mode.

In the image display method, the first image and the second image are spaced apart from each other and are displayed in the second display mode. The mode of display illustrated in FIG. 7 is an example of such a second display mode. Display in the second display mode may be performed in any other manner.

An image display device corresponding to the image display method may be provided. An image display device displays a first image and a second image in a display area, the second image being adjacent to the first image, and includes: the display unit 112 that displays the first image and the second image in the display area; and the display control unit 131 that causes the display unit 112 to perform display in the display area with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed. In FIG. 2, the terminal device 12 is an example of the image display device. The terminal device 12 includes the display unit 112 and the display control unit 131.

An image display device displays a first image and a second image in a display area, the second image being adjacent to the first image, and includes: the display unit 112 that displays the first image and the second image in the display area; and the display control unit 131 that causes the display unit 112 to perform display with switching between a first display mode and a second display mode, the first display mode being a mode in which the second image displayed in the display area overlaps with the first image, and the second display mode being a mode in which the first image and the second image are displayed without any overlap therebetween. In FIG. 2, the terminal device 12 is an example of the image display device. The terminal device 12 includes the display unit 112 and the display control unit 131.

A display control program corresponding to the image display method may be provided. A display control program is to be run on a computer. The computer commands that a first image and a second image be displayed in a display area, the second image being adjacent to the first image. The display control program causes the computer to perform operations including: performing display with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed. In FIG. 2, the computer of the terminal device 12 runs the display control program.

Also provided is a display control program to be run on a computer, the computer commanding that a first image and a second image be displayed in a display area, the second image being adjacent to the first image, the display control program causing the computer to perform operations including: performing display with switching between a first display mode and a second display mode, the first display mode being a mode in which the second image overlaps with the first image, and the second display mode being a mode in which the first image and the second image are displayed without any overlap therebetween.

A display control program for realizing the functions of any of the components of any device such as the terminal device 12 and the image processing device 11 described above may be stored into a computer-readable storage medium, and the program may be read to be executed by a computer system. The "computer system" mentioned here encompasses an operating system or hardware of peripheral equipment, etc. The "computer-readable storage medium" mentioned here means a storage medium including, but not limited to, a portable medium such as flexible disk, magnetic optical disk, ROM, CD-ROM (Compact Disk), etc. or a storage device such as a hard disk, etc. built in a computer system. The "computer-readable storage medium" mentioned here encompasses a medium that keeps a program stored for a defined period of time such as a volatile memory in a computer system serving as a server or a client in a case where the program is transmitted via a network such as the Internet or via a communication channel such as a telephone line. The volatile memory may be a RAM. The storage medium may be a non-transitory storage medium.

The program may be transmitted from a computer system in which the program is stored in a storage device, etc. to another computer system via a transmission medium or by means of a transmission wave in a transmission medium. The "transmission medium" transmitting the program mentioned here means a medium that has a function of transmitting information, for example, a network such as the Internet, or a communication channel such as a telephone line. The program may realize a part of the foregoing functions. The program may be capable of realizing the foregoing functions by being combined with a program that has already been stored in the computer system. That is, the program may be a so-called difference file. The difference file may be called as a difference program.

The functions of any of the components of any device such as the terminal device 12 and the image processing device 11 described above may be realized by a processor. Each processing disclosed in the exemplary embodiments may be realized by a processor configured to operate based on information of a program and by a computer-readable storage medium storing the information of the program. The processor may realize the functions of the components in the form of separate hardware blocks. Alternatively, the processor may realize the functions of the components in the form of an integrated piece of hardware. The processor may include hardware, and the hardware may include at least one of a circuit that processes a digital signal or a circuit that processes an analog signal. The processor may be configured using either one or both of one or more circuit devices mounted on a circuit board and one or more circuit elements.

An IC (Integrated Circuit), etc. may be used as the circuit device. A resistor or a capacitor, etc. may be used as the circuit element.

The processor may be a CPU. However, the processor is not limited to a CPU. Various kinds of a processor such as a GPU (Graphics Processing Unit) or a DSP (Digital Signal Processor), etc. may be used. The processor may be a hardware circuit that is based on ASIC. The processor may comprise a plurality of CPUs. Alternatively, the processor may comprise a plurality of hardware circuits that are based on ASIC. The processor may comprise a combination of a plurality of CPUs and a plurality of hardware circuits that are based on ASIC. The processor may include one or more of an amplifier circuit, a filter circuit, etc. that processes an analog signal.

Although exemplary embodiments of the present disclosure have been explained in detail above with reference to the accompanying drawings, their specific configuration is not limited to those described and illustrated in the embodiments. The scope of the present disclosure encompasses design, etc. that is within a range not departing from the gist of the present disclosure.

What is claimed is:

1. An image display method of displaying a plurality of images including a first image and a second image in a display area, the second image being adjacent to the first image and a width of the second image being larger than a width of the first image, comprising:
   performing display with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed, wherein
   the first display mode is performed when a sum of widths of images to be displayed in the display area is greater than a pre-determined width,
   the second display mode is performed when the sum of widths of images to be displayed in the display area is less than the pre-determined width,
   one axis in a coordinate system for the second display mode is different from any axis of a coordinate system for the first display mode, and
   wherein a width of one image among the plurality of images, when displayed in the first display mode, along a horizontal direction of the display area is shorter than a width of the one image, when displayed in the second display mode, along the horizontal direction of the display area.

2. The image display method according to claim 1, wherein
   in the first display mode, the first image displayed as the three-dimensional image and the second image displayed as the three-dimensional image are displayed in an overlapping manner, and
   in the second display mode, the first image displayed as the two-dimensional image and the second image displayed as the two-dimensional image are displayed without any overlap therebetween.

3. The image display method according to claim 1, wherein
   a plurality of images different from the first image and different from the second image is displayed,
   in the first display mode, the first image displayed as the three-dimensional image, the second image displayed as the three-dimensional image, and the plurality of images displayed as three-dimensional images are arranged along an axis, and
   in the second display mode, the first image displayed as the two-dimensional image, the second image displayed as the two-dimensional image, and the plurality of images displayed as two-dimensional images are arranged along the axis.

4. The image display method according to claim 1, wherein
   based on instructions given by a user, the display is switched between the first display mode and the second display mode.

5. The image display method according to claim 1, wherein the widths of images to be displayed in the display area in a state, in which an image plane of each image is oriented toward a user, are used.

6. The image display method according to claim 1, wherein, when images have been displayed in the display area in the second display mode, the second display mode is switched to the first display mode if a number of the images is too large to be fully displayed inside the display area.

7. The image display method according to claim 1, wherein, when images are displayed in the display area in the first display mode, the first display mode is switched to the second display mode if a number of the images is small enough to be fully displayed two dimensionally inside the display area.

8. The image display method according to claim 1, wherein
   in the first display mode, a number of visible vertices of each image is four when each image is not covered by any image, and a number of visible vertices of one image, which is partially covered by another image, is three.

9. An image display device that displays a plurality of images including a first image and a second image in a display area, the second image being adjacent to the first image and a width of the second image being larger than a width of the first image, comprising:
   a display that displays the first image and the second image in the display area; and
   a display controller that causes the display to perform display in the display area with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed, wherein
   the first display mode is performed when a sum of widths of images to be displayed in the display area is greater than a pre-determined width,
   the second display mode is performed when the sum of widths of images to be displayed in the display area is less than the pre-determined width, and
   one axis in a coordinate system for the second display mode is different from any axis of a coordinate system for the first display mode, and
   wherein a width of one image among the plurality of images, when displayed in the first display mode, along a horizontal direction of the display area is shorter than a width of the one image, when displayed in the second display mode, along the horizontal direction of the display area.

10. The image display device according to claim 9, wherein
in the first display mode, the display controller causes the display to display, in an overlapping manner, the first image displayed as the three-dimensional image and the second image displayed as the three-dimensional image, and
in the second display mode, the display controller causes the display to display, without any overlap therebetween, the first image displayed as the two-dimensional image and the second image displayed as the two-dimensional image.

11. The image display device according to claim 9, wherein
the display displays a plurality of images different from the first image and different from the second image,
in the first display mode, the display controller arranges, along an axis, the first image displayed as the three-dimensional image, the second image displayed as the three-dimensional image, and the plurality of images displayed as three-dimensional images, and
in the second display mode, the display controller arranges, along the axis, the first image displayed as the two-dimensional image, the second image displayed as the two-dimensional image, and the plurality of images displayed as two-dimensional images.

12. The image display device according to claim 9, wherein the widths of images to be displayed in the display area in a state, in which an image plane of each image is oriented toward a user, are used.

13. The image display device according to claim 9, wherein, when images have been displayed in the display area in the second display mode, the second display mode is switched to the first display mode if a number of the images is too large to be fully displayed inside the display area.

14. The image display device according to claim 9, wherein, when images are displayed in the display area in the first display mode, the first display mode is switched to the second display mode if a number of the images is small enough to be fully displayed two dimensionally inside the display area.

15. A non-transitory computer-readable storage medium storing a display control program to be run on a computer, the computer commanding that a plurality of images including a first image and a second image be displayed in a display area, the second image being adjacent to the first image and a width of the second image being larger than a width of the first image, the display control program causing the computer to perform operations comprising:
performing display with switching between a first display mode and a second display mode, the first display mode being a mode in which the first image displayed as a three-dimensional image and the second image displayed as a three-dimensional image are displayed, and the second display mode being a mode in which the first image displayed as a two-dimensional image and the second image displayed as a two-dimensional image are displayed, wherein
the first display mode is performed when a sum of widths of images to be displayed in the display area is greater than a pre-determined width,
the second display mode is performed when the sum of widths of images to be displayed in the display area is less than the pre-determined width, and
one axis in a coordinate system for the second display mode is different from any axis of a coordinate system for the first display mode, and
wherein a width of one image among the plurality of images, when displayed in the first display mode, along a horizontal direction of the display area is shorter than a width of the one image, when displayed in the second display mode, along the horizontal direction of the display area.

16. The non-transitory computer-readable storage medium storing the display control program according to claim 15, wherein
in the first display mode, the first image displayed as the three-dimensional image and the second image displayed as the three-dimensional image are displayed in an overlapping manner, and
in the second display mode, the first image displayed as the two-dimensional image and the second image displayed as the two-dimensional image are displayed without any overlap therebetween.

17. The non-transitory computer-readable storage medium storing the display control program according to claim 15, wherein
a plurality of images different from the first image and different from the second image is displayed,
in the first display mode, the first image displayed as the three-dimensional image, the second image displayed as the three-dimensional image, and the plurality of images displayed as three-dimensional images are arranged along an axis, and
in the second display mode, the first image displayed as the two-dimensional image, the second image displayed as the two-dimensional image, and the plurality of images displayed as two-dimensional images are arranged along the axis.

18. The non-transitory computer-readable storage medium storing the display control program according to claim 15, wherein
based on instructions given by a user, the display is switched between the first display mode and the second display mode.

19. The non-transitory computer-readable storage medium storing the display control program according to claim 15, wherein the widths of images to be displayed in the display area in a state, in which an image plane of each image is oriented toward a user, are used.

20. The non-transitory computer-readable storage medium storing the display control program according to claim 15, wherein, when images have been displayed in the display area in the second display mode, the second display mode is switched to the first display mode if a number of the images is too large to be fully displayed inside the display area.

21. The non-transitory computer-readable storage medium storing the display control program according to claim 15, wherein, when images are displayed in the display area in the first display mode, the first display mode is switched to the second display mode if a number of the images is small enough to be fully displayed two dimensionally inside the display area.

* * * * *